(12) United States Patent
Li et al.

(10) Patent No.: US 10,825,363 B2
(45) Date of Patent: Nov. 3, 2020

(54) DISPLAY APPARATUS

(71) Applicant: BOE TECHNOLOGY GROUP CO., LTD., Beijing (CN)

(72) Inventors: Wenbo Li, Beijing (CN); Xinguo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/499,523

(22) PCT Filed: Mar. 21, 2019

(86) PCT No.: PCT/CN2019/079083
§ 371 (c)(1),
(2) Date: Sep. 30, 2019

(87) PCT Pub. No.: WO2019/179502
PCT Pub. Date: Sep. 26, 2019

(65) Prior Publication Data
US 2020/0043385 A1      Feb. 6, 2020

(30) Foreign Application Priority Data

Mar. 23, 2018  (CN) .................... 2018 2 0407143 U (51) Int. Cl.
*G09F 9/30* (2006.01)
*G06F 1/16* (2006.01)
(Continued)

(52) U.S. Cl.
CPC ............ *G09F 9/301* (2013.01); *G06F 1/1616* (2013.01); *G06F 1/1626* (2013.01);
(Continued)

(58) Field of Classification Search
CPC combination set(s) only.
See application file for complete search history.

(56) References Cited

U.S. PATENT DOCUMENTS 7,355,338 B2 *   4/2008   Osame ................. G06F 1/1616
                                                     313/503
7,430,025 B2 *   9/2008   Okamoto ............ G02F 1/13338
                                                     349/56
(Continued)

FOREIGN PATENT DOCUMENTS

CN         1426045 A      6/2003
CN       101763747 A      6/2010
(Continued)

OTHER PUBLICATIONS

International Search Report and Written Opinion issued in corresponding International Application No. PCT/CN2019/079083, dated Jul. 3, 2019, with English language translation.

*Primary Examiner* — Lisa Lea-Edmonds
(74) *Attorney, Agent, or Firm* — McDermott Will & Emery LLP (57) ABSTRACT

A display apparatus includes a first display apparatus and a second display apparatus that are stacked. A display image quality of the first display apparatus in a display state is higher than a display image quality of the second display apparatus in a display state, and a power consumption of the second display apparatus in the display state is lower than a power consumption of the first display apparatus in the display state.

19 Claims, 4 Drawing Sheets

(51) Int. Cl.
*G09F 9/33* (2006.01)
*G09F 9/37* (2006.01)
*G09G 3/32* (2016.01)
*G09G 3/36* (2006.01)

(52) U.S. Cl.
CPC .............. *G06F 1/1652* (2013.01); *G09F 9/33* (2013.01); *G09F 9/37* (2013.01); *G09G 3/32* (2013.01); *G09G 3/36* (2013.01); *G09G 2300/023* (2013.01); *G09G 2330/021* (2013.01)

(56) References Cited

U.S. PATENT DOCUMENTS

| | | | | |
|---|---|---|---|---|
| 8,106,852 | B2* | 1/2012 | Fujinawa | G02F 1/1347 345/4 |
| 8,648,880 | B2* | 2/2014 | Namba | G06F 1/1616 345/635 |
| 9,733,744 | B2* | 8/2017 | Lee | G06F 3/0412 |
| 9,804,635 | B2* | 10/2017 | Kim | G06F 3/0488 |
| 9,934,755 | B2* | 4/2018 | Roh | G02B 27/0101 |
| 10,026,368 | B2* | 7/2018 | Hidaka | G09G 3/3426 |
| 10,359,810 | B2* | 7/2019 | Miyake | H01K 1/00 |
| 10,401,627 | B1* | 9/2019 | Richards | G09G 3/20 |
| 10,606,541 | B2* | 3/2020 | Yanagisawa | G06F 3/044 |
| 2003/0107564 | A1 | 6/2003 | Miyazawa | |
| 2008/0247128 | A1* | 10/2008 | Khoo | H04M 1/0214 361/679.04 |
| 2009/0029739 | A1* | 1/2009 | Okamoto | G06F 1/1686 455/566 |
| 2016/0080730 | A1 | 3/2016 | Wu | |
| 2016/0232856 | A1* | 8/2016 | Hidaka | G09G 3/147 |
| 2018/0059717 | A1* | 3/2018 | Kim | G06F 3/1438 |
| 2018/0331991 | A1* | 11/2018 | Kim | G06F 1/1677 |
| 2020/0043385 | A1 | 2/2020 | Li et al. | |

FOREIGN PATENT DOCUMENTS

| | | |
|---|---|---|
| CN | 101763748 A | 6/2010 |
| CN | 101763751 A | 6/2010 |
| CN | 101944311 A | 1/2011 |
| CN | 201716963 U | 1/2011 |
| CN | 202736459 U | 2/2013 |
| CN | 103473996 A | 12/2013 |
| CN | 205301768 U | 6/2016 |
| CN | 106504729 A | 3/2017 |
| CN | 106504730 A | 3/2017 |
| CN | 208077524 U | 11/2018 |

* cited by examiner

DISPLAY APPARATUS

CROSS-REFERENCE TO RELATED APPLICATION

This application is a national phase entry under 35 USC 371 of International Patent Application No. PCT/CN2019/079083 filed on Mar. 21, 2019, which claims priority to Chinese Patent Application No. 201820407143.8, filed with the Chinese Patent Office on Mar. 23, 2018, titled "A DISPLAY APPARATUS", which are incorporated herein by reference in their entirety.

TECHNICAL FIELD

The present disclosure relates to the field of display technologies, and in particular, to a display apparatus.

BACKGROUND

With the development of electronic technologies, information can be stored in electronic media and displayed through electronic display devices. For example, photo information is stored in the secure digital memory card (SD card), and can be displayed through display devices such as digital photo frames or electronic painted screens.

SUMMARY

A display apparatus is provided. The display apparatus includes a first display apparatus and a second display apparatus that are stacked. A display image quality of the first display apparatus in a display state is higher than a display image quality of the second display apparatus in a display state, and a power consumption of the second display apparatus in the display state is lower than a power consumption of the first display apparatus in the display state.

In some embodiments, the second display apparatus includes a multi-stable display apparatus having N types of steady states, N being a positive integer greater than or equal to two.

In some embodiments, the second display apparatus is located at a display side of the first display apparatus, and the second display apparatus transmits light in a non-display state.

In some embodiments, the second display apparatus is fixedly disposed on a display surface of the first display apparatus, and the display surface is a surface of the display side of the first display apparatus.

In some embodiments, the first display apparatus is located at a display side of the second display apparatus, and the first display apparatus transmits light in a non-display state.

In some embodiments, the first display apparatus is fixedly disposed on a display surface of the second display apparatus, and the display surface is a surface of the display side of the second display apparatus.

In some embodiments, the display apparatus further includes a moving component. The moving component is connected to the first display apparatus and the second display apparatus, and the moving component is configured to move one of the first display apparatus and the second display apparatus to a display side of another of the first display apparatus and the second display apparatus or an opposite side of the display side.

In some embodiments, the moving component includes: a first rotating shaft fixedly connected to the first display apparatus; a second rotating shaft fixedly connected to the second display apparatus; and a linkage block rotatably connected to the first rotating shaft and the second rotating shaft respectively.

In some embodiments, one of the first display apparatus and the second display apparatus is a flexible display apparatus, and another of the first display apparatus and the second display apparatus is a non-flexible display apparatus. The moving component includes a rotation axis, and the rotation axis is drivingly connected to the flexible display apparatus. An end of the flexible display apparatus bypasses the rotation axis and extends to be disposed at a display side of the non-flexible display apparatus or an opposite side of the display side.

In some embodiments, both the first display apparatus and the second display apparatus are flexible display apparatuses. The moving component includes a rotation axis, and the rotation axis is drivingly connected to one of the flexible display apparatuses. An end of the flexible display apparatus that is drivingly connected to the rotation axis bypasses the rotation axis and extends to be disposed at a display side of another flexible display apparatus or an opposite side of the display side.

In some embodiments, the display apparatus further includes a driving component. The driving component is connected to the moving component, and the driving component is configured to drive the moving component to move the first display apparatus or the second display apparatus.

In some embodiments, the display apparatus further includes a controller. The controller is electrically connected to the first display apparatus, the second display apparatus and the driving component respectively. The controller is configured to control the first display apparatus and the second display apparatus to perform display in different time periods, and control the driving component to drive the moving component to move.

In some embodiments, the display apparatus further includes an electronic sensor. The electronic sensor is electrically connected to the controller. The electronic sensor is configured to sense human body information to send a sensing signal to the controller according to the human body information. The controller is further configured to control the first display apparatus, the second display apparatus, and the driving component according to the sensing signals sent by the electronic sensor.

In some embodiments, the first display apparatus includes a liquid crystal display apparatus, an organic light-emitting diode display apparatus, a plasma display apparatus, or a quantum dot display apparatus.

In some embodiments, the second display apparatus includes an electrochromic display device, an electrowetting display device, a cholesteric liquid crystal display device, or an electrophoretic display device.

In some embodiments, the second display apparatus includes an electronic ink display.

In some embodiments, the first display apparatus and the second display apparatus are configured to perform display in different time periods.

In some embodiments, the second display apparatus is fixedly disposed on the display surface of the first display apparatus by at least one connection mode of bonding, riveting or screw joint.

In some embodiments, the first display apparatus is fixedly disposed on the display surface of the second display apparatus by at least one connection mode of bonding, riveting or screw joint.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in embodiments of the present disclosure will be described clearly and completely with reference to the accompanying drawings in embodiments of the present disclosure. Obviously, the described embodiments are merely some but not all of embodiments of the present disclosure. All other embodiments made on the basis of the embodiments of the present disclosure by a person of ordinary skill in the art shall be included in the protection scope of the present disclosure.

In the process of image display or screen display through a display device such as a digital photo frame or an electronic painted screen, the display device needs to have different display performance according to the user's different requirements for the display image. For example, when a screen displayed by a display device is a work of art, the display device is required to have a good display effect in order to meet artist's requirements for the delicateness of the screen. However, even if a screen displayed by a display device is a work of art, the display device does not need to be in a good display state all the time in a case where the work of art is not appreciated by the artist or hung for a long time as an ornament, otherwise it is easy to cause waste of electric energy, resulting in a large power consumption of the display device.

Figure 1:
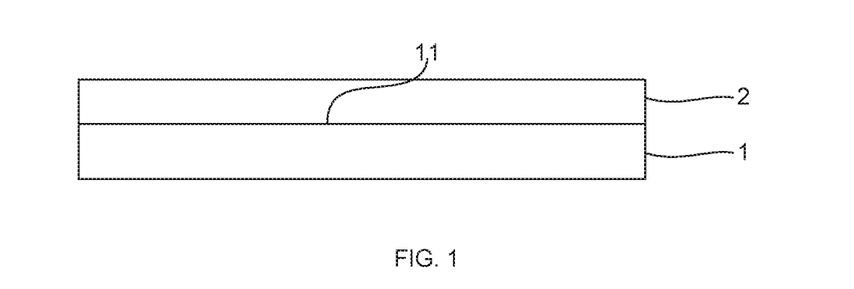
FIG. 1 is a schematic structural diagram of a display apparatus, in accordance with some embodiments of the present disclosure.
Figure 2:
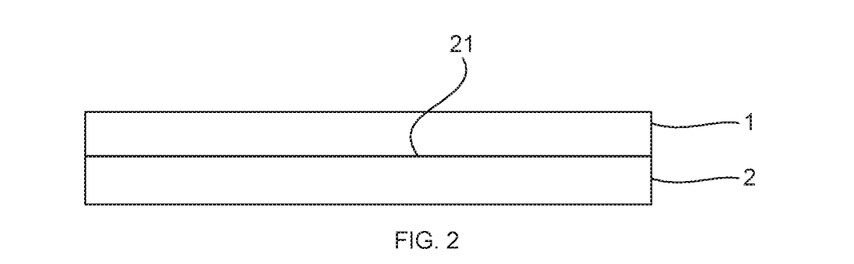
FIG. 2 is a schematic structural diagram of another display apparatus, in accordance with some embodiments of the present disclosure.

Based on this, some embodiments of the present disclosure provide a display apparatus. Referring to FIGS. 1 and 2, the display apparatus includes a first display apparatus 1 and a second display apparatus 2 that are stacked and configured to perform display in different time periods. A display image quality of the first display apparatus 1 in a display state is higher than a display image quality of the second display apparatus 2 in a display state, and a power consumption of the second display apparatus 2 in the display state is lower than a power consumption of the first display apparatus 1 in the display state.

The first display apparatus 1 and the second display apparatus 2 have different display performance and power consumption. The first display apparatus 1 and the second display apparatus 2 are disposed to be stacked, for example, fixedly connected or movably connected. The display in different time periods of the two apparatus refers to that the first display apparatus 1 and the second display apparatus 2 perform display in different time periods respectively. That is, in a case where the first display apparatus 1 performs display, the second display apparatus 2 is in a non-display state, or in a case where the second display apparatus 2 performs display, the first display apparatus 1 is in a non-display state. Here, it will be understood that, the display image quality of the first display apparatus 1 and the second display apparatus 2 are both higher than the user's minimum requirements for a display image quality.

In some embodiments of the present disclosure, the first display apparatus 1 and the second display apparatus 2 are disposed to be stacked, and the first display apparatus 1 and the second display apparatus 2 perform display in different time periods, which may be convenient for users to select an appropriate display apparatus from the first display apparatus 1 and the second display apparatus 2 to perform display according to their different requirements for display image in different use periods. For example, in a case where the display apparatus is needed as an ornament, the second display apparatus 2 of which the display image quality is lower than that of the first display apparatus 1 is used for display, which does not affect the user's satisfaction with the display of the display apparatus. Moreover, since the power consumption of the second display apparatus 2 is lower than that of the first display apparatus 1, the power consumption can be saved when the second display apparatus 2 is used for display, for example, waste of electric energy can be reduced. In a case where the display image of the display apparatus is needed to be carefully appreciated as a work of art, the first display apparatus 1 of which the display image quality is higher than that of the second display apparatus 2 is used for display, which can satisfy the user's (e.g., artist) requirement for the delicateness of the screen, so as to enhance the user's visual experience. Therefore, the display apparatus provided by some embodiments of the present disclosure can meet the user's diverse requirements, and is beneficial to improving the user's satisfaction.

It will be noted that, in some embodiments, the second display apparatus 2 serves as a display apparatus of which the display power consumption and the display image quality are lower than that of the first display apparatus 1, and the second display apparatus 2 includes a multi-stable display apparatus having N types of steady states, N being a positive integer greater than or equal to two.

The multi-stable display apparatus is capable of performing display in two or more different steady states. The multi-stable display apparatus does not require a continuous voltage supply when performing display in any one steady state, and power is required only to switch between every two steady states, such as when the screen is refreshed. That is to say, the multi-stable display apparatus generally realizes display through a power-off display mode and a power-on switching mode. If the multi-stable display apparatus is stable in a certain display state for a long time, its consumption of electric energy is small, which is advantageous for reducing power consumption, so that the multi-stable display apparatus is suitable for a scene in which the display image does not need to be frequently updated, such as a digital photo frame, an electronic painted screen or an electronic billboard.

For example, the second display apparatus 2 is a bi-stable display device. Each display cell of the bi-stable display device can have two different display states, i.e., a bright state and a dark state, without being applied a voltage, and can maintain the two states correspondingly, so this state referred to as a bi-stable state. The bi-stable display device can memorize and display an image without being applied an voltage, thereby effectively reducing power consumption. In an ideal state, the bi-stable display device can save up to hundreds of times of power consumption compared with a conventional liquid crystal display device. In addition, the bi-stable display device scatters light to display an image through particles, a dielectric liquid, or a cholesteric liquid crystal (Ch-LC), that is, to display an image by using scattering of ambient light, which belongs to a non-emissive technique. It consumes less energy than an emissive display device such as an organic light-emitting diode (OLED) in the conventional display devices, because the emissive display device requires more electric energy for generating light that is brighter than the external ambient light to display a more visible image. It will be seen that the bi-stable display device is significantly lower in power consumption than the conventional display device.

In some embodiments described above, the multi-stable display device serves as the second display apparatus 2. The operation of the second display apparatus 2 between the power-off display mode and power-on switching mode can be realized on a premise that the second display apparatus 2 has the required display image quality, so as to further reduce the power consumption of the second display apparatus 2.

Referring to FIGS. 1 and 2, in a case where the first display apparatus 1 and the second display apparatus 2 are disposed to be stacked, the second display apparatus 2 is located at a display side 11 of the first display apparatus 1, or the first display apparatus 1 is located at a display side 21 of the second display apparatus 2.

In some embodiments, as shown in FIG. 1, the second display apparatus 2 is located at the display side 11 of the first display apparatus 1, and the second display apparatus 2 transmits light in a non-display state. In this way, in the process of displaying by using the second display apparatus 2, the first display apparatus 1 is located at a non-display side of the second display apparatus 2 and is in a non-display state. The presence of the first display apparatus 1 does not affect the display effect of the second display apparatus 2, or the presence of the first display device 1 has little effect on the display effect of the second display device 2. In the process of displaying by using the first display apparatus 1, the second display apparatus 2 is in the non-display state and can transmit light. Although the second display apparatus 2 is located at the display side 11 of the first display apparatus 1, the second display apparatus 2 does not block display light of the first display apparatus 1. It can be ensured that the first display apparatus 1 completes its display of a higher display image quality.

For example, the second display apparatus 2 is fixedly disposed on a display surface of the first display apparatus 1, and the display surface of the first display apparatus 1 refers to a surface on which the first display apparatus 1 is configured to display an image. The second display apparatus 2 is fixedly connected to the first display apparatus 1 by means of bonding, riveting or screw joint and other connection modes, so that a relative position of the second display apparatus 2 and the first display apparatus 1 is fixed. In this way, only by switching display states of the second display apparatus 2 and the first display apparatus 1, can the user select and use different display modes in the display apparatus. Herein, the switching of the display states of the second display apparatus 2 and the first display apparatus 1 can be manually controlled or controlled by a controller.

The display image quality of the first display apparatus 1 is higher than that of the second display apparatus 2. The first display apparatus 1 may be of various types, such as a liquid crystal display apparatus, an organic light-emitting diode display apparatus, a plasma display apparatus, or a quantum dot display apparatus. The type of the first display apparatus 1 is not limited in some embodiments of the present disclosure, as long as the display image quality of the first display apparatus 1 can satisfy the artist's requirements for the delicateness of the screen.

Similarly, the type of the second display apparatus 2 is not limited in some embodiments of the present disclosure, as long as the display image quality of the second display apparatus 2 is higher than the user's minimum requirements for the display image quality, and the power consumption thereof is far lower than that of the first display apparatus 1.

For example, the second display apparatus 2 is an electrochromic display device. Electrochromic material is provided in the electrochromic display device. Electrochromism refers to a phenomenon that optical properties (reflectivity, transmittance, absorptivity, etc.) of a material undergo a stable and reversible color change under action of an applied electric field, showing a reversible change in color and transparency in appearance. That is to say, the electrochromic material has bistable properties, so that the electrochromic display device made of the electrochromic material not only do not require a backlight, but also do not consume electric energy as long as the display content does not change after displaying a still image, which can achieve the purpose of energy saving.

For example, the second display apparatus 2 is an electrowetting display device. An oil film dye is provided in the electrowetting display device. By changing the voltage between droplets in the oil film dye and a substrate, the wettability of the droplets on the substrate can be changed, that is, a contact angle of the droplets can be changed, so that the droplets are deformed and displaced to change the display state of the electrowetting display device.

For example, the second display apparatus 2 is an electrophoretic display device. The electrophoretic display device uses electrophoretic display technology, that is, the voltage is used to drive colored charged particles to move in the electrophoresis liquid, which can present a display effect of different colors. In some embodiments, the electrophoretic display device is a bistable display device. The electrophoretic display has two types of charged particles, one is white particles and the other is light-absorbing particles, such as black particles. When the white particles gather on the display surface of the display device to reflect white light, the display device is in a display state, and when the light-absorbing particles gather on the display surface of the display device to absorb light, the display device is in a non-display state. In other embodiments, the electrophoretic display has a type of charged particles (for example, white particles) and a colored dielectric liquid. When the white particles gather on the display surface of the display device to reflect white light, the display device is in a display state (that is, the display device displays white), and when the white particles move to the opposite side of the display surface of the display device, the color displayed on the display is converted to another color, which is the color of the dielectric liquid that can be seen by the user.

For example, the second display apparatus 2 is a cholesterol liquid crystal display device. Cholesterol liquid crystal is provided in the cholesterol liquid crystal display device. The cholesterol liquid crystal is a special liquid crystal arranged in a spiral shape and belongs to a type of organic display materials. In the cholesteric liquid crystal, by adding optical rotation agents with different rotation pitches, red, green, blue and other colors can be showed correspondingly to meet the requirements of color display. Since the cholesteric liquid crystal display technology is similar to the electrophoretic display technology, it can have the characteristics of the bistable display, that is, when the image is still, almost no electricity is required. Therefore, the cholesteric liquid crystal display technology has the same power-saving characteristics as the electrophoretic display technology.

It will be added that, several different types of the second display apparatuses 2 described above can all realize reflective display, that is, can reflect ambient light to display the image, thereby further reducing the power consumption of the display apparatus.

For example, the second display apparatus 2 is an electronic ink display device. Like most traditional inks, electronic ink and the circuit that change its color can be printed on the surface of various soft materials, and the soft materials, for example, include bendable plastics, polyester films, papers or cloths. What is different from traditional inks is that the color of the electronic ink is changed when it is powered on by the above circuit, and the electronic ink can display a changed image, thereby achieving the same display effect as a display interface in calculators or mobile phones. Therefore, the electronic ink display device is apt to be made into a flexible display apparatus, thus it is beneficial to achieving the movement of the second display apparatus 2 at a display side 11 of the first display apparatus 1 or an opposite side of the display side 11. For example, the second display apparatus 2 is wound on a reel, and the rotation of the reel drives the second display apparatus 2 to move at the display side 11 or the opposite side of the display side 11 of the first display apparatus 1, which can further save space for movement.

In some embodiments, the second display apparatus 2 uses a relatively lightweight and thin flexible display apparatus composed of an electronic ink display device or an electrochromic display device, which is easier to achieve light transmission in the non-display state.

Of course, in some embodiments, as shown in FIG. 2, the first display apparatus 1 is located at a display side 21 of the second display apparatus 2, and the first display apparatus 1 transmits light in the non-display state. In this case, the switching of the display states of the first display apparatus 1 and the second display apparatus 2 can be completed by referring to the description of some of the above embodiments. In addition, similarly, it is also permissible that the first display apparatus 1 is fixedly disposed on the display surface of the second display apparatus 2.

In some embodiments, referring to FIGS. 3-7, the display apparatus further includes a moving component 3. The moving component 3 is connected to the first display apparatus 1 and the second display apparatus 2, and the moving component 3 is configured to move one of the first display apparatus 1 and the second display apparatus 2 to the display side of the other or the opposite side of the display side. That is to say, the first display apparatus 1 and the second display apparatus 2 are movably connected.

A structure of the moving component 3 is not specifically limited in some embodiments of the present disclosure, as long as the moving component 3 can realize a relative motion between the first display apparatus 1 and the second display apparatus 2. The relative motion between the first display apparatus 1 and the second display apparatus 2 includes a relative rotation or a relative translation.

Figure 3:
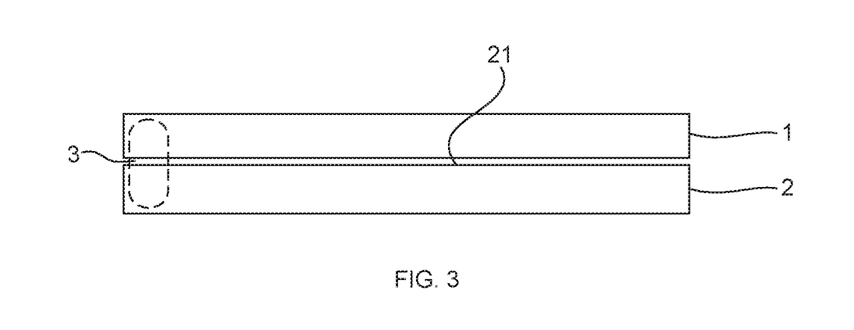
FIG. 3 is a schematic structural diagram of yet another display apparatus, in accordance with some embodiments of the present disclosure.
Figure 4:
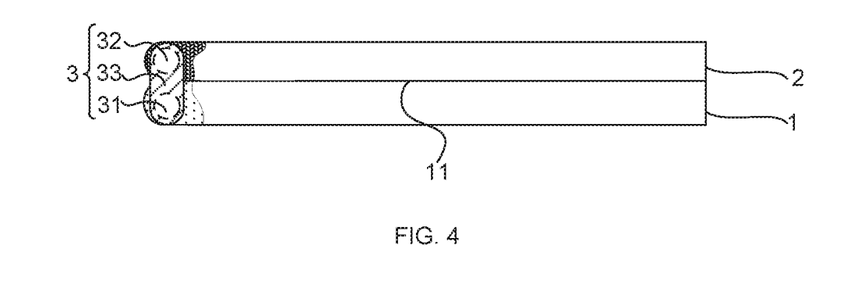
FIG. 4 is a schematic structural diagram of yet another display apparatus, in accordance with some embodiments of the present disclosure.

For example, the first display apparatus 1 and the second display apparatus 2 are non-flexible display apparatuses, and a relative motion between the first display apparatus 1 and the second display apparatus 2 is a relative rotation. Referring to FIGS. 3 and 4, the moving component 3 includes: a first rotating shaft 31 fixedly connected to the first display apparatus 1, a second rotating shaft 32 fixedly connected to the second display apparatus 2, and a linkage block rotatably connected to the first rotating shaft 31 and the second rotating shaft 32 respectively. In this way, the first display apparatus 1 can be flipped 360° relative to the second display apparatus 2, and vice versa (i.e., the second display apparatus 2 can be flipped 360° relative to the first display apparatus 1). Of course, other structures that are capable of achieving a 360° flip between the first display apparatus 1 and the second display apparatus 2 can also applicable to the moving component 3.

When the first display apparatus 1 is required to perform display, the first display apparatus 1 is flipped to the display side of the second display apparatus 2. When the second display apparatus 2 is required to perform display, the second display apparatus 2 is flipped to the display side of the first display apparatus 1. In a case where the display apparatus uses such a structure (that is, the above moving component 3), neither the first display apparatus 1 nor the second display apparatus 2 has a limitation of light transmission in the non-display state. That is to say, in a case where the display apparatus includes the above moving component 3, in some embodiments, the first display apparatus 1 is a display apparatus that transmits light in the non-display state, in other embodiments, the first display apparatus 1 is a display apparatus that does not transmit light in the non-display state. Similarly, in a case where the display apparatus includes the above moving component 3, in some embodiments, the second display apparatus 1 is a display apparatus that transmits light in the non-display state, in other embodiments, the second display apparatus 1 is a display apparatus that does not transmit light in the non-display state.

For example, at least one of the first display apparatus 1 and the second display apparatus 2 is a flexible display apparatus, and the relative motion between the first display apparatus 1 and the second display apparatus 2 is the relative translation.

In some embodiments, referring to FIGS. 5a and 5b, and FIGS. 6a and 6b, one of the first display apparatus 1 and the second display apparatus 2 is a flexible display apparatus and the other is a non-flexible display apparatus. The moving component 3 includes a rotation axis 30 that is drivingly connected to the flexible display apparatus, and an end of the flexible display apparatus bypasses the rotation axis 30 and extends to be disposed at the display side of the non-flexible display apparatus or the opposite side of the display side.

Figure 5A:
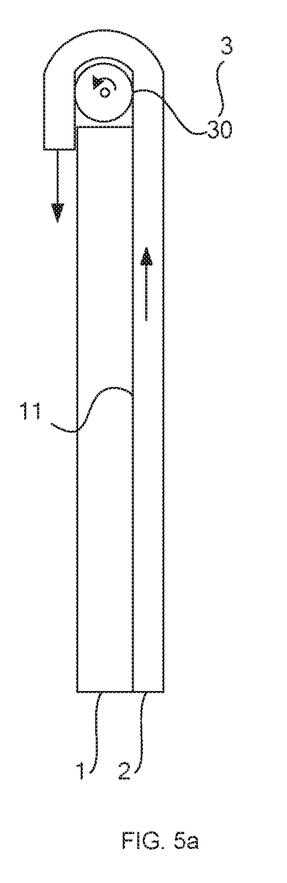
FIGS. 5a and 5b are schematic structural diagrams of yet another display apparatus in two different states of use, in accordance with some embodiments of the present disclosure.
Figure 5B:
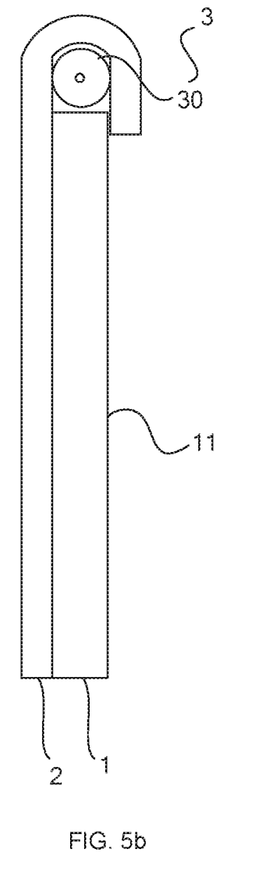

For example, referring to FIGS. 5a and 5b, the second display apparatus 2 is a flexible display apparatus and the first display apparatus 1 is a non-flexible display apparatus. The rotation axis 30 is located at an end of the first display apparatus 1 (for example, a top shown in FIG. 5a), and the rotation axis 30 and the end of the first display apparatus 1 are rotatably connected, or are not connected. The rotation axis 30 is drivingly connected to the second display apparatus 2, such as a friction drive coupling or a meshing drive coupling.

In an initial state, as shown in FIG. 5a, the second display apparatus 2 is located at the display side 11 of the first display apparatus 1, and an end of the second display apparatus 2 bypasses the rotation axis 30 and extends to be disposed at the opposite side of the display side 11 of the first display apparatus 1. In a case where the first display apparatus 1 is required to perform display, that is, when the display apparatus needs to be switched from a low power consumption display mode to a high image quality display mode, the rotation axis 30 is rotated counterclockwise, and a portion of the second display apparatus 2 located at the display side 11 of the first display apparatus 1 is driven by the rotation axis 30 to move to the opposite side of the display side 11 of the first display apparatus 1. That is, the portion of the second display apparatus 2 located at the display side 11 of the first display apparatus 1 moves upward, and a portion of the second display apparatus 2 that bypasses the rotation axis 30 and extends to be disposed at the opposite side of the display side 11 of the first display apparatus 1 moves downward, so that the second display apparatus 2 moves in parallel relative to the display surface of the first display apparatus 1 under the power transmission of the rotation axis 30.

As shown in FIG. 5b, when the portion of the second display apparatus 2 located at the display side 11 of the first display apparatus 1 does not block the display surface of the first display apparatus 1, the rotation of the rotation axis 30 is stopped, and the first display apparatus 1 is used to perform display.

In a case where the second display apparatus 2 is required to perform display, that is, when the display apparatus needs to be switched from the high image quality display mode to the low power consumption display mode, the rotation axis 30 is rotated clockwise, and a portion of the second display apparatus 2 located at the opposite side of the display side 11 of the first display apparatus 1 is driven by the rotation axis 30 to move to the display side 11 of the first display apparatus 1, until the portion of the second display apparatus 2 located at the display side 11 of the first display apparatus 1 covers the display surface of the first display apparatus 1, and the second display apparatus 2 is used to perform display.

Figure 6A:
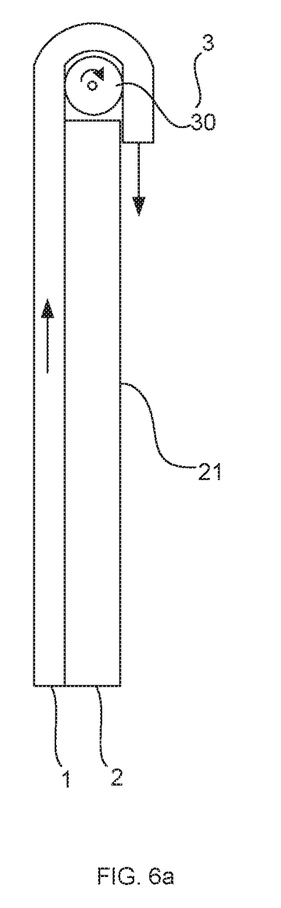
FIGS. 6a and 6b are schematic structural diagrams of yet another display apparatus in two different states of use, in accordance with some embodiments of the present disclosure.
Figure 6B:
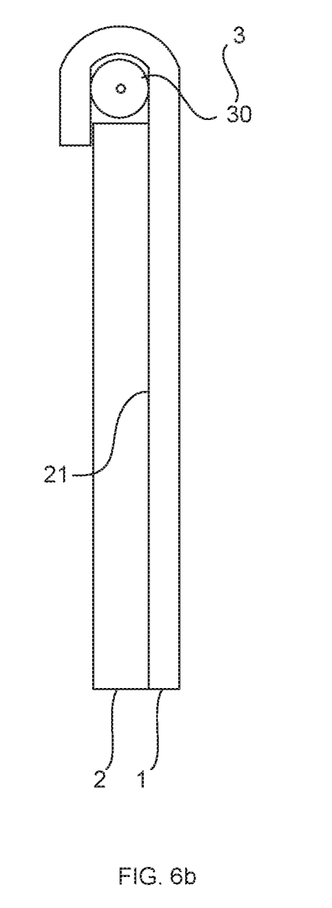

For example, referring to FIGS. 6a and 6b, the second display apparatus 2 is a non-flexible display apparatus and the first display apparatus 1 is a flexible display apparatus. The rotation axis 30 is located at an end of the second display apparatus 2 (for example, a top shown in FIG. 6a), and the rotation axis 30 and the end of the second display apparatus 2 are rotatably connected, or are not connected. The rotation axis 30 is drivingly connected to the first display apparatus 1, such as a friction drive coupling or a meshing drive coupling.

In an initial state, as shown in FIG. 6a, the first display apparatus 1 is located at the opposite side of the display side 21 of the second display apparatus 2, and an end of the first display apparatus 1 bypasses the rotation axis 30 and extends to be disposed at the display side 21 of the second display apparatus 2. In a case where the first display apparatus 1 is required to perform display, that is, when the display apparatus needs to be switched from the low power consumption display mode to the high image quality display mode, the rotation axis 30 is rotated clockwise, and a portion of the first display apparatus 1 located at the opposite side of the display side 21 of the second display apparatus 2 is driven by the rotation axis 30 to move to the display side 21 of the second display apparatus 2. That is, a portion of the first display apparatus 1 that bypasses the rotation axis 30 and extends to be disposed at the display side 21 of the second display apparatus 2 moves downward, and a portion of the first display apparatus 1 disposed at the opposite side of the display side 21 of the second display apparatus 2 moves upward, so that the first display apparatus 1 moves in parallel relative to the display surface of the second display apparatus 2 under the power transmission of the rotation axis 30.

As shown in FIG. 6b, when a portion of the first display apparatus 1 located at the display side 21 of the second display apparatus 2 covers the display surface of the first display apparatus 1, the rotation of the rotation axis 30 is stopped, and the first display apparatus 1 is used to perform display.

In a case where the second display apparatus 2 is required to perform display, the rotation axis 30 is rotated counterclockwise, and the portion of the first display apparatus 1 located at the display side 21 of the second display apparatus 2 is driven by the rotation axis 30 to move to the opposite side of the display side 21 of the second display apparatus 2, until the portion of the first display apparatus 1 located at the display side of the second display apparatus 2 does not block the display surface of the second display apparatus 2, and the second display apparatus 2 is used to perform display.

In some embodiments, the flexible display apparatus can be driven to move to a display side of the non-flexible display apparatus or an opposite side of the display side through the reciprocal rotation of the rotation axis 30, thereby realizing the switching of the display apparatus between the low power consumption display mode and the high image quality display mode. In this way, a required moving space is small, that is, the high image quality display mode can be used to satisfy the artist's demand for the delicateness of an image, and the low power consumption display mode can be used to achieve the decoration effect of an ornament in a case where the energy consumption is low, thereby meeting the diverse requirements of the user.

Moreover, in some embodiments, the relative translation between the first display apparatus 1 and the second display apparatus 2 can also be implemented in other ways. For example, the second display apparatus 2 is a flexible display apparatus, and at least two ends of the second display apparatus 2 are mounted with support rods respectively. The movement of the support rods in a horizontal direction or a vertical direction can drive the second display apparatus 2 to move relative to the first display apparatus 1, including drive the second display apparatus 2 to move at the display side of the first display apparatus 1 or the opposite side of the display side.

Of course, in some embodiments, the first display apparatus 1 and the second display apparatus 2 are both flexible display apparatuses, and the relative movement between the first display apparatus 1 and the second display apparatus 2 is a relative translation. The moving component 3 includes the rotation axis 30 that is drivingly connected to one of the flexible display apparatuses. An end of the flexible display apparatus that is drivingly connected to the rotation axis 30 bypasses the rotation axis 30 and extends to be disposed at the display side of the other or the opposite side of the display side. In this way, through the reciprocal rotation of the rotation axis 30, the flexible display apparatus that is drivingly connected to the rotation axis 30 can be driven to move to a display side of another flexible display apparatus or an opposite side of the display side, thereby realizing the switching of the display apparatus between the low power consumption display mode and the high image quality display mode.

Figure 7:
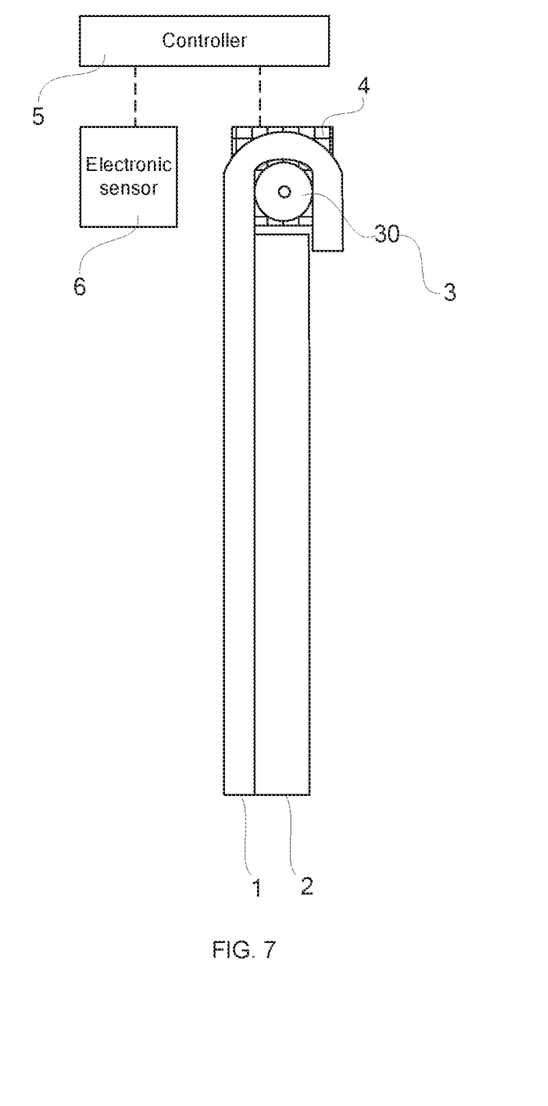
FIG. 7 is a schematic structural diagram of yet another display apparatus, in accordance with some embodiments of the present disclosure.

In some embodiments, referring to FIG. 7, the display apparatus further includes a driving component 4. The driving component 4 is connected to the moving component 3, and the driving component 4 is configured to drive the moving component 3 to move the first display apparatus 1 or the second display apparatus 2.

For example, with continuous reference to FIG. 7, the moving component 3 is a rotation axis 30, and the driving component 4 is a motor (for example, a stepping motor). The driving component 4 drives the moving component 3 to rotate, and the moving component 3 is used to drive the first display apparatus 1 that is drivingly connected to the moving component 3 to move.

In some embodiments, with continuous reference to FIG. 7, the display apparatus further includes a controller 5. The controller 5 is electrically connected to the first display apparatus 1, the second display apparatus 2, and the driving component respectively. The controller is configured to control the first display apparatus 1 and the second display apparatus 2 to perform display in different time periods, and control the driving component 4 to drive the moving component 3 to move.

In some embodiments, the display apparatus further includes an electronic sensor 6. The electronic sensor 6 is electrically connected to the controller 5, and the electronic sensor 6 is configured to sense human body information to send a sensing signal to the controller 5 according to the sensed human body information. The controller 5 is further configured to control the first display apparatus 1, the second display apparatus 2, and the driving component 4 according to the sensing signal sent by the electronic sensor 6.

For example, the electronic sensor 6 is a human body infrared sensor or a human body contact sensor. After continuously sensing the human body information for a period of time, the electronic sensor 6 sends a sensing signal to the controller 5 according to the sensed human body information. For example, the electronic sensor 6 continuously senses the human body information for a period of 10 s (seconds), which is not specifically limited in some embodiments of the present disclosure.

The electronic sensor 6 can identify whether the sensed human body only passes by the region where the display apparatus is located or is watching the screen displayed by the display apparatus by determining whether a duration of the sensed human body information is greater than a preset duration, thereby determining whether it is necessary to output the sensing signal to the controller 5 to control the corresponding first display apparatus or the second display apparatus to complete a switching between the display modes.

For example, the preset duration is 10 s. If the duration of the electronic sensor 6 continuously sensing the human body information is less than 10 s, it means that the human body only passes by the region where the display apparatus is located, the electronic sensor 6 does not need to send the sensing signal to the controller 5, and the controller 5 can control the second display apparatus 2 to complete the display in the low power display mode. If the duration of the electronic sensor 6 continuously sensing the human body information is greater than 10 s, it means that the human body is staying in front of the display apparatus to carefully watch an image displayed by the display apparatus, and the electronic sensor 6 needs to send the sensing signal to the controller 5, so that the controller 5 controls the first display apparatus 1 to complete the display in the high image quality display mode. In this way, the display apparatus provided by some embodiments of the present disclosure can not only realize an automatic control of the display apparatus, but also avoid unnecessary refresh between the low power consumption display mode and the high image quality display mode to reduce the electrical loss of the display apparatus.

In the description of the above embodiments, specific features, structures, materials or characteristics may be combined in an appropriate manner in any one or more embodiments or examples.

The above embodiments are merely some specific embodiments of the present disclosure, but the protection scope of the present disclosure is not limited thereto. Any person skilled in the art could readily conceive of changes or replacement within the technical scope of the present disclosure, which shall all be included in the protection scope of the present disclosure. Therefore, the protection scope of the present disclosure shall be determined by the protection scope of the claims.

What is claimed is:

1. A display apparatus, comprising: a first display apparatus and a second display apparatus that are stacked, and a moving component, wherein
   a display image quality of the first display apparatus in a display state is higher than a display image quality of the second display apparatus in a display state, and a power consumption of the second display apparatus in the display state is lower than a power consumption of the first display apparatus in the display state; and
   the moving component is connected to the first display apparatus and the second display apparatus, and the moving component is configured to move one of the first display apparatus and the second display apparatus to a display side of another of the first display apparatus and the second display apparatus or an opposite side of the display side.

2. The display apparatus according to claim 1, wherein the second display apparatus includes a multi-stable display apparatus having N types of steady states, N being a positive integer greater than or equal to two.

3. The display apparatus according to claim 1, wherein the second display apparatus is located at a display side of the first display apparatus, and the second display apparatus transmits light in a non-display state.

4. The display apparatus according to claim 1, wherein the first display apparatus is located at a display side of the second display apparatus, and the first display apparatus transmits light in a non-display state.

5. The display apparatus according to claim 1, wherein the moving component includes:
   a first rotating shaft fixedly connected to the first display apparatus;
   a second rotating shaft fixedly connected to the second display apparatus; and
   a linkage block rotatably connected to the first rotating shaft and the second rotating shaft respectively.

6. The display apparatus according to claim 1, wherein
one of the first display apparatus and the second display apparatus is a flexible display apparatus, and another of the first display apparatus and the second display apparatus is a non-flexible display apparatus;
the moving component includes a rotation axis, and the rotation axis is drivingly connected to the flexible display apparatus; and
an end of the flexible display apparatus bypasses the rotation axis and extends to be disposed at a display side of the non-flexible display apparatus or an opposite side of the display side.

7. The display apparatus according to claim 1, wherein
both the first display apparatus and the second display apparatus are flexible display apparatuses;
the moving component includes a rotation axis, and the rotation axis is drivingly connected to one of the flexible display apparatuses; and
an end of the flexible display apparatus that is drivingly connected to the rotation axis bypasses the rotation axis and extends to be disposed at a display side of another flexible display apparatus or an opposite side of the display side.

8. The display apparatus according to claim 1, further comprising a driving component, wherein
the driving component is connected to the moving component, and the driving component is configured to drive the moving component to move the first display apparatus or the second display apparatus.

9. The display apparatus according to claim 8, further comprising a controller, wherein
the controller is electrically connected to the first display apparatus, the second display apparatus and the driving component respectively; and the controller is configured to control the first display apparatus and the second display apparatus to perform display in different time periods, and control the driving component to drive the moving component to move.

10. The display apparatus according to claim 9, further comprising an electronic sensor, wherein
the electronic sensor is electrically connected to the controller;
the electronic sensor is configured to sense human body information to send a sensing signal to the controller according to the human body information; and
the controller is further configured to control the first display apparatus, the second display apparatus, and the driving component according to the sensing signals sent by the electronic sensor.

11. The display apparatus according to claim 1, wherein
the first display apparatus includes a liquid crystal display apparatus, an organic light-emitting diode display apparatus, a plasma display apparatus, or a quantum dot display apparatus.

12. The display apparatus according to claim 1, wherein
the second display apparatus includes an electrochromic display device, an electrowetting display device, a cholesteric liquid crystal display device, or an electrophoretic display device.

13. The display apparatus according to claim 1, wherein
the second display apparatus includes an electronic ink display.

14. The display apparatus according to claim 1, wherein
the first display apparatus and the second display apparatus are configured to perform display in different time periods.

15. A display apparatus, comprising: a first display apparatus and a second display apparatus that are stacked, wherein
a display image quality of the first display apparatus in a display state is higher than a display image quality of the second display apparatus in a display state, and a power consumption of the second display apparatus in the display state is lower than a power consumption of the first display apparatus in the display state; and
the second display apparatus includes an electronic ink display.

16. The display apparatus according to claim 15, wherein the second display apparatus is fixedly disposed on a display surface of the first display apparatus, the display surface is a surface of a display side of the first display apparatus, and the second display apparatus transmits light in a non-display state.

17. The display apparatus according to claim 15, wherein the first display apparatus is fixedly disposed on a display surface of the second display apparatus, the display surface is a surface of a display side of the second display apparatus, and the first display apparatus transmits light in a non-display state.

18. The display apparatus according to claim 16, wherein the second display apparatus is fixedly disposed on the display surface of the first display apparatus by at least one connection mode of bonding, riveting or screw joint.

19. The display apparatus according to claim 17, wherein the first display apparatus is fixedly disposed on the display surface of the second display apparatus by at least one connection mode of bonding, riveting or screw joint.

* * * * *